United States Patent

Fales

[15] 3,660,814

[45] May 2, 1972

[54] VEHICLE CONDITION RESPONSIVE MONITORING SYSTEM

[72] Inventor: Douglas I. Fales, Flint, Mich.

[73] Assignee: General Motors Corporation, Detroit, Mich.

[22] Filed: Nov. 20, 1970

[21] Appl. No.: 91,491

[52] U.S. Cl. ............................................340/52 F, 340/181
[51] Int. Cl. .......................................................G08b 19/00
[58] Field of Search...................340/52, 52 F, 177, 181, 195, 340/197

[56] References Cited

UNITED STATES PATENTS 3,283,314   11/1966   Stewart..............................340/177 X
3,302,191   1/1967    Ziegler..................................340/177

Primary Examiner—Alvin H. Waring
Attorney—J. L. Carpenter and Paul Fitzpatrick

[57] ABSTRACT

Apparatus for providing information as to a plurality of conditions using a single air core gauge. Each condition being monitored controls a switch that in turn controls the energization of at least one winding, the magnetic fields generated by the windings forming a resultant magnetic field that controls the orientation of an indicia-bearing rotatable disc. When one or more windings are energized a lamp illuminates the indicia that is located at a certain position by the disc so as to indicate the status of the condition which caused energization of the winding. A steering diode network permits the monitoring of more conditions than the number of windings employed in the gauge. A warning network provides an immediate indication of a change in a condition being monitored regardless of the position of the rotatable disc.

4 Claims, 6 Drawing Figures

PATENTED MAY 2 1972 3,660,814

INVENTOR.
Douglas I. Fales
BY
Paul Fitzpatrick
ATTORNEY

PATENTED MAY 2 1972

INVENTOR.
Douglas I. Fales

BY
Paul Fitzpatrick
ATTORNEY

VEHICLE CONDITION RESPONSIVE MONITORING SYSTEM

This invention relates to apparatus which advises as to the status of a plurality of conditions at various remote locations and, more particularly, to motor vehicle systems for monitoring a plurality of conditions at various remote locations in a motor vehicle and for indicating the status of the conditions being monitored. This invention also relates to my copending U.S. applications, Ser. Nos. 91,490 and 91,393 which were both filed on Nov. 20, 1970 and assigned to the assignee of this invention.

Many warning systems for advising of conditions in a motor vehicle are presently in widespread use. These systems may, for example, be employed to monitor fuel level in a gas tank, coolant level in a radiator, oil pressure in an engine crankcase, or the charging of a battery by an electrical generating system. Generally these prior systems are of two types: they either provide a continuous indication of the condition being monitored, the well-known fuel gauge being one example, or they advise the vehicle occupant only of a condition which has changed to such an extent as to need his attention, as is the case with lamps which are employed as tell-tales. In either event these systems have had to compete for space with many other devices which must also be located in a vehicle dashboard so as to be within reach and observation of the vehicle operator. Since the motoring public is provided an opportunity to enjoy an ever-increasing number of comfort and convenience features offered by vehicle manufacturers, the space limitations in vehicle dashboards are continuously becoming more acute.

Accordingly, it is an object of this invention to provide apparatus which monitors a large number of conditions in a motor vehicle and which employs a single dashboard unit to convey information regarding the various monitored conditions to the vehicle operator.

A further object of this invention is the implementation of a single air core gauge to monitor a plurality of conditions at various locations in a motor vehicle.

Another object of this invention is the provision of an air core gauge which indicates a plurality of conditions in a motor vehicle and which only provides an affirmative indication as to the status of the monitored conditions which the attention of the vehicle operator to one or more of the conditions is required.

It is a further object of this invention to provide an air core gauge for monitoring a plurality of conditions which exceed in number the number of gauge windings employed in the air core gauge without requiring duplication of sensing devices.

It is yet another object of this invention to provide a single air core gauge which monitors a plurality of conditions and which immediately advises the vehicle operator when one of the conditions being monitored requires his immediate attention.

The satisfaction of the foregoing objects and the advantages of the subject invention will be apparent from the accompanying description and drawings, in which.

Figure 1:
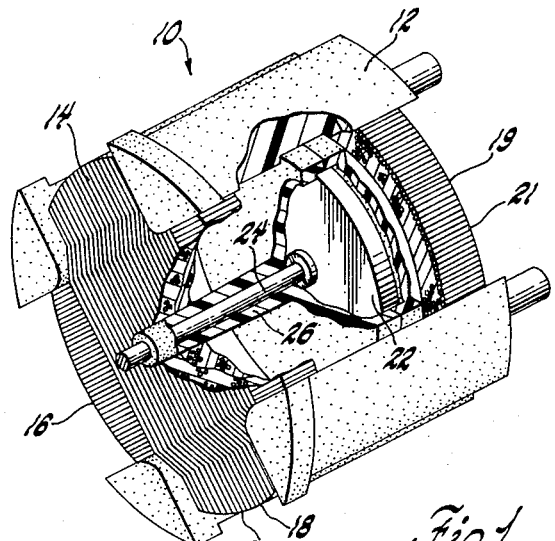
FIG. 1 depicts an air core gauge of the prior art which may be employed in practicing the subject invention.

Referring now to the drawings, FIG. 1 shows an air core gauge 10 of the type disclosed in Ziegler, U.S. Pat. No. 3,302,191, which may be employed in practicing the subject invention. As shown in FIG. 1, the gauge 10 includes a winding support member 12 on which are disposed first and second coils 14 and 16. The first coil 14 includes a first set of coaxial windings 18 and 20 and the second coil includes a second set of coaxial windings 19 and 21, the windings 18 through 20 in the coils 14 and 16 being positioned and wound so as to generate magnetic fields when energized that oppose each other. The winding support member 12 supports the coils 14 and 16 so that their respective axes are substantially at 90° to each other, which causes the magnetic fields produced by the windings 18 through 21 to combine in a resultant magnetic field in which the magnetic fields of the opposed windings are cancelled when the opposed windings are equally energized. In addition, the gauge 10 also includes a permanent magnet armature 22 rotatably supported by a shaft 24 that is restrained in a guideway 26.

Figure 2:
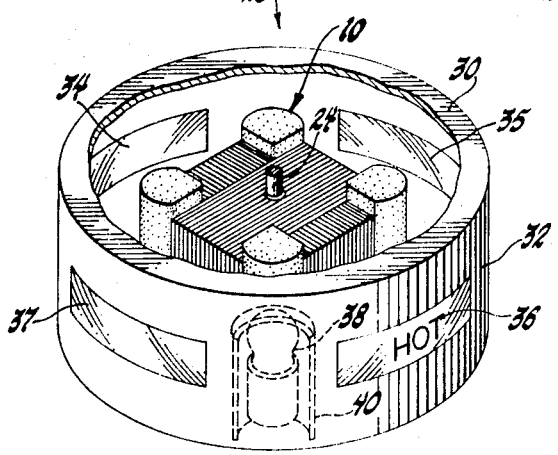
FIG. 2 is a perspective view, with parts broken away, of an indicator embodying the principles of the subject invention.
Figure 3:
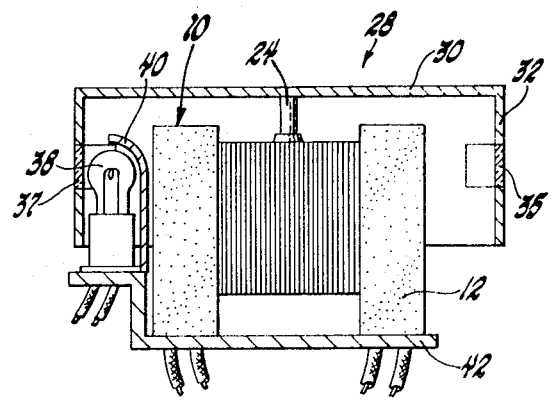
FIG. 3 is a cross-sectional view of the indicator in FIG. 1.

As shown in FIGS. 2 and 3, an indicator 28 according to the preferred and illustrated embodiment includes the gauge 10 of FIG. 1 disposed with the shaft 24 vertical and drivably connected to a rotatable disc 30, which has a depending edge 32 so as to rotate the disc 30 in accordance with the energization of the windings 18 through 21. A plurality of windows 34 through 37 which bear indicia are disposed on the depending edge 32 of the disc 30 so as to be aligned with a light source, such as a lamp 38, that is mounted in a shroud 40 behind the depending edge 32 of the disc 30. The lamp 38 and the winding support member 12 are held in a fixed relative position by suitable supporting apparatus, such as a bracket 42 illustrated in FIG. 3.

Accordingly, as a condition which is being monitored effects a change in the energization of the windings 18 through 21 the corresponding change in the resultant magnetic field causes the armature 22 to rotate to a new position in which one of the windows 34 through 37 and the indicia which it bears is aligned with the lamp 38. Upon energization of the lamp 38 the window is illuminated by the lamp 38 and the vehicle occupant is made aware of the change in the condition being monitored.

For example, if it is assumed that the lamp 38 and the windings 18 through 21 are all normally deenergized and that one of the windings 18 through 21 is responsive to the temperature of the vehicle engine the lamp 38 is normally deenergized and the vehicle operator is therefore not affirmatively advised of any malfunction of the conditions being monitored in the vehicle. That is, so long as the lamp 38 remains deenergized he may assume that the conditions being monitored are functioning normally. However, should the engine temperature exceed a predetermined level the winding with which it is associated will be immediately energized and at a predetermined time after the winding is energized the lamp 38 will be energized, as will subsequently be explained. Accordingly, the disc 30 is first rotated so as to align the window 36, on which is the indicia HOT, with the lamp 38 and then the lamp 38 is energized. Upon energization of the lamp 38 the vehicle operator is advised of the overheated condition of the engine.

Figure 4:
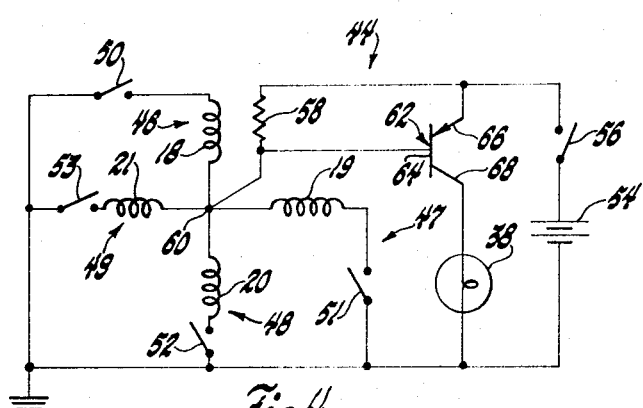
FIG. 4 is a schematic representation of an indicator circuit according to the principles of the subject invention.

A control circuit 44 for controlling the energization of the windings 18 through 21 and the lamp 38 is schematically illustrated in FIG. 4. As shown in FIG. 4, several detection networks 46 through 49 are provided for monitoring various conditions in a vehicle. Each detection network 46 through 49 includes one of a plurality of normally open switches 50 through 53 connected in series with one of the respective windings 18 through 21. Power is supplied to the windings 18 through 21 by a suitable power source, such as a vehicle battery 54, through a power switch, such as a vehicle ignition switch 56, in accordance with the setting of the switches 50 through 53. A resistor 58 is connected in series with the windings 18 through 21 and the battery 54 so as to form a voltage divider in which the common junction 60 of the windings 18 through 21 undergoes a wide voltage excursion in accordance with the energization of the windings 18 through 21, the voltage excursion being sensed by a PNP transistor 62 which controls the energization of the lamp 38.

So long as all the switches 50 through 53 are open substantially the entire voltage of the battery 54 is applied through the ignition switch 56 and the resistor 58 to the common junction 60 of the windings 18 through 21. Accordingly, the base 64 of the transistor 62, which is connected to the junction 60, is at substantially the same voltage as the emitter 66 of the transistor 62 so the transistor 62 is biased to its nonconductive condition. The transistor 62 thus normally prevents energization of the lamp 38, which is in series with the collector 68 of the transistor 62.

However, should one of the switches 50 through 53, such as the switch 52, be closed due, for example, to an overheated engine, the junction 60 of the windings 18 through 21 would be at a relatively low potential that is established by the voltage divider action of the resistor 58 in series with the winding 20. Since the resistance of the winding 20 is relatively small, the base 64 of the transistor 62 would thus be at a much lower voltage than the emitter 66 and the forward biased base-emitter junction of the transistor 62 makes the transistor 62 conductive so as to energize the lamp 38. Accordingly, the energization of the winding 20 causes the disc 30 to be rotated so as to align the window 36 with the lamp 38 and the energization of the lamp 38 illuminates both the window 36 and the indicia which it contains so as to advise the vehicle operator that the overheated engine needs his attention.

It should be noted that the time constant formed by the resistor 58 and one of the windings 18 through 21 when the corresponding switch of the switches 50 through 53 is closed provides a valuable time delay in the operation of the indicator 28. Since the disc 30 in all probability is not aligned with the lamp 38 for a proper indication the moment one of the switches 50 through 53 is closed, the disc 30 begins to rotate as soon as one of the windings 18 through 21 is energized. If the lamp 38 also were immediately energized when one of the windings 18 through 21 becomes energized the indicator 28 may give an initial indication that is erroneous due to the motion of the disc 30. Accordingly, the windings 18 through 21 and the resistor 58 are selected so that the voltage at the junction 60 is decreased at a sufficiently slow rate when one of the switches 50 through 53 is closed as to introduce a certain time delay into the central circuit 44.

By properly selecting the windings 18 through 21 and the resistor 58 the junction 60 voltage is maintained at a sufficiently high voltage as to maintain the transistor 62 nonconductive until an energized winding has aligned the disc 30 for a proper indication of the malfunction. The disc 30 is thus always properly aligned before the lamp 38 is energized. As persons versed in the art will appreciate, various other time delay circuitry could also be employed to further delay the energization of the lamp 38 after closure of one of the switches 50 through 53. Indeed, the lamp 38 may be selected to be of a type in which the lamp is not illuminated for a certain time after the lamp is energized. A "slow lamp," as these lamps are sometimes called, would preclude false indications by the indicator 28 before the disc 30 is properly aligned and would therefore eliminate the need for additional time delay apparatus.

Figure 5:
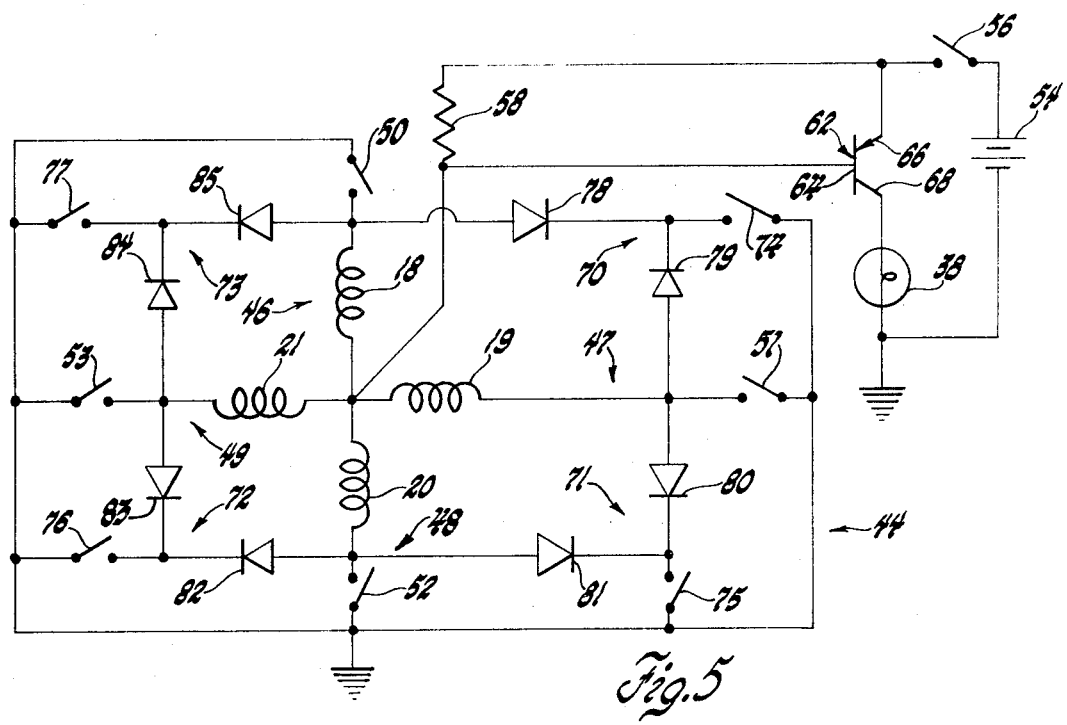
FIG. 5 is a modification of the indicator circuit in FIG. 4 having an increased capacity.

In the embodiment illustrated in FIG. 5 several diode networks 70 through 73 and normally open supplemental switches 74 through 77 that are responsive to various conditions in the vehicle have been added to the control circuit 44 of FIG. 4. The diode networks 70 through 73 are comprised of steering diodes 78 through 85, two of the steering diodes 78 through 85 that have their cathodes connected together being included in each of the diode networks 70 through 73. The supplemental switches 74 through 77 are connected to the cathodes of the steering diodes 78 through 85 so as to provide for energizing two of the windings 18 through 21 upon closure of any one of the supplemental switches 74 through 76, as contrasted to the energization of only one of the windings 18 through 21 upon closure of one of the primary switches 50 through 53.

Assume, for example, that the supplemental switch 75 is responsive to engine oil pressure in the vehicle and is closed only when the engine oil pressure has fallen below a certain level. So long as all monitored conditions are operating properly the junction 60 of the windings 18 through 21 is substantially at the potential of the battery 54 and the indicator lamp 38 remains deenergized. Since the indicator 28 is not affirmatively providing the vehicle operator with an indication of the malfunction he may properly assume that all of the systems being monitored are operating satisfactorily.

However, should the engine oil pressure fall below the certain level the supplemental switch 75 closes so as to cause energization of the winding 19 through the diode 80 and energization of the winding 20 through the diode 81. Accordingly, closure of the supplemental switch 75 causes simultaneous energization of the windings 19 and 20 so as to generate a resultant magnetic field which is oriented in a direction which positions the disc 30 between the positions which the disc 30 would adopt if either of the windings 19 or 20 were energized alone. Similarly, closing one of the other supplemental switches 74, 76, or 77 results in energizing two of the windings 18 through 21. Since only one of the windings 18 through 21 is energized when one of the primary switches 50 through 53 is closed, it is apparent that closing any one of the primary switches 50 through 53 or supplemental switches 74 through 77 results in the disc 30 being placed in a unique position. It is thus apparent that the control network 44 in FIG. 5 provides eight unique positions of the disc 30 and can therefore be used to monitor eight conditions in a vehicle for malfunctions while requiring only the four windings 18 through 21 to indicate to the vehicle operator when a malfunction occurs. Accordingly, the control circuit 44 in FIG. 5 allows the indicator 28 to be very compact and built according to a less expensive design than would be required if a different winding had to be energized when each of the eight conditions being monitored suffered a malfunction.

Figure 6:
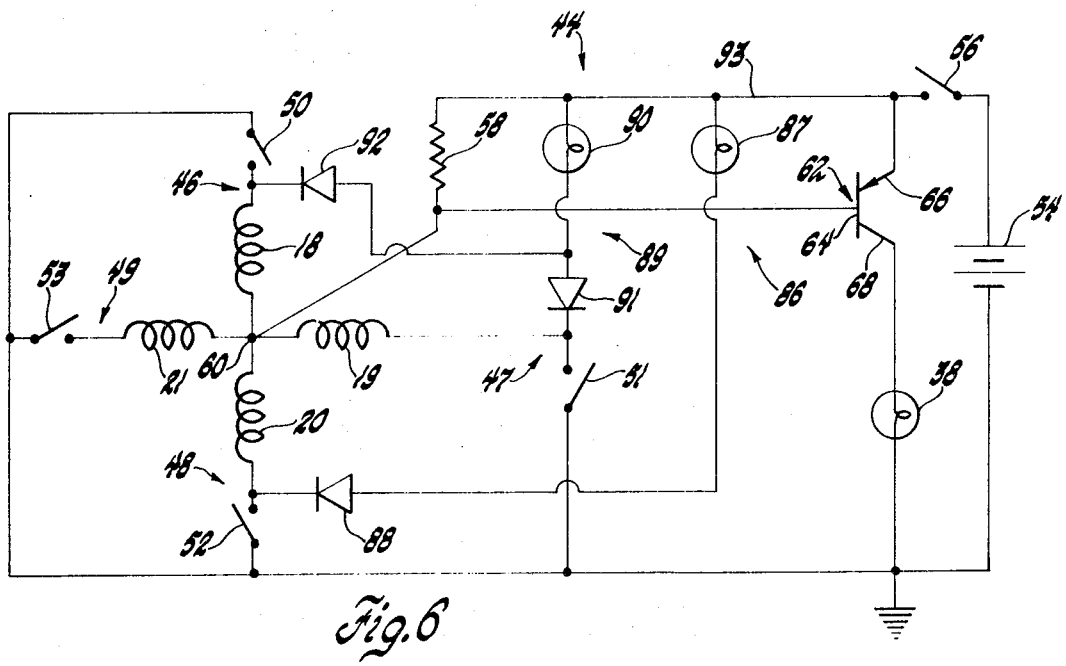
FIG. 6 is a modification of the indicator circuit in FIG. 4 having a provision for providing the vehicle operator with immediate warnings of malfunctions.

In FIG. 6 the control circuit 44 of FIG. 4 has been changed to provide an immediate warning to the vehicle operator when certain conditions occur in the vehicle regardless of the time required for the lamp 38 to be energized in the fashion previously explained. These warnings are provided by a first telltale network 86 comprising a first lamp 87 and a first steering diode 88 and a second telltale network 89 comprising a second lamp 90 and a second and third steering diodes 91 and 92.

In FIG. 6 closure of the switch 52 due to a change in the condition being monitored by the switch 52, such as the temperature of a vehicle engine, effects energization of the winding 20 and, after the predetermined time delay, energization of the lamp 38 to indicate the change in the condition being monitored, as previously explained. In addition, closure of the switch 52 completes a current path from the battery 54 through the ignition switch 56, a lead 93, the first lamp 87, and the first steering diode 88. The first lamp 87 is thus immediately energized upon closure of the switch 52 so as to place the driver of the vehicle on notice of an unusually serious malfunction existing in the vehicle. The vehicle operator is therefore immediately advised by the energization of the first lamp 87 that a serious malfunction exists in the vehicle though the precise nature of the malfunction is not conveyed to him until the lamp 38 is energized so as to illuminate the disc 30. As previously discussed, the illumination of the lamp 38 is briefly delayed until the disc 30 is properly aligned by either employing time delay circuitry, such as the RL timing network formed by the resistor 58 and the windings 18 through 21, or a "slow" lamp as the lamp 38. In either case, an immediate notice of the type provided by the first lamp 87 may be especially useful when the engine oil pressure has decreased below a safe level as continued operation of the engine without proper oil pressure may result in serious damage to the engine.

Similarly, closing either of the switches 50 or 51 causes energization of the second lamp 90 through the corresponding second or third steering diode 91 or 92. Since the second lamp 90 may be energized upon closure of either of the switches 50 or 51 it may be desirable for the second lamp 90 to be placed on the vehicle dashboard and labeled as being an immediate warning regarding a single system in which the switches 50 and 51 monitor two conditions. The second lamp 90 will thus immediately indicate a malfunction of the system. Closing one of the switches 50 or 51 also effects energization of the corresponding winding 18 or 19, causing the disc 30 to assume a unique position relative to the lamp 38. accordingly, when the lamp 38 is subsequently illuminated after the aforedescribed time delay a subsequent indication as to the precise type of malfunction which has occurred in the system is provided by the indicator 28.

It is thus apparent that the apparatus herein described advises a vehicle operator of malfunction in any of a large number of systems that are being monitored, though persons versed in the art will appreciate that many modifications of this apparatus in addition to those herein described may be made without departing from the spirit of this invention.

What is claimed is:

1. Apparatus for indicating the status of a plurality of conditions comprising, in combination, a plurality of switches each responsive to at least one of the conditions being monitored, each of the switches normally being in a first operative state and being changed to a second operative state upon a predetermined change in the condition being monitored by the switch, a plurality of windings each connected in series with one of the switches to form a detection network and effective when energized to produce a magnetic field along the axis of the winding, the axes of the windings being aligned at predetermined angles to each other whereby the magnetic fields generated by the windings form a resultant magnetic field the orientation of which varies in accordance with the energization of the windings, means connecting the detection networks in parallel, means for connecting the detection networks to a power source effective upon placement of a switch in the second operative state to cause the energization by the power source of the winding in series circuit with the switch, indicating means for indicating the status of the conditions being monitored, the indicating means including an indicia bearing member, means for moving the indicia bearing member past a certain position in accordance with the orientation of the resultant magnetic field, a lamp for illuminating the indicia at the certain position, means responsive to the energization of the windings effective to energize the lamp when a winding is energized and deenergize the lamp when the windings are deenergized whereby a change in the status of a certain condition being monitored effects illumination of predetermined indicia at the certain position, and time delay means for preventing the lamp from being energized for a predetermined time after winding has been energized so as to prevent the lamp from illuminating indicia other than that indicative of the changed status of the certain condition.

2. Apparatus for indicating the status of a plurality of conditions comprising, in combination, a plurality of switches each responsive to at least one of the conditions being monitored, each of the switches normally being in a first operative state and being changed to a second operative state upon a predetermined change in the condition being monitored by the switch, a plurality of windings each connected in series with one of the switches to form a detection network and effective when energized to produce a magnetic field along the axis of the winding, the axes of the windings being aligned at predetermined angles to each other whereby the magnetic fields generated by the windings form a resultant magnetic field the orientation of which varies in accordance with the energization of the windings, means connecting the detection networks in parallel, a resistor, means for connecting the detection networks in series with the resistor and a power source effective upon placement of a switch in the second operative condition to cause the energization by the power source of the winding in series circuit with the switch, and indicating means for indicating the status of the conditions being monitored, the indicating means including a permanent magnet armature rotatably positioned so as to be self-aligning with the resultant magnetic field, a disc drivably coupled to the armature for movement therewith, the disc having indicia disposed thereon so as to be movable past a certain position in accordance with the orientation of the armature, the disc positioning predetermined indicia at the certain position in accordance with the energization of the windings and closure of the switches, a lamp for illuminating the indicia at the certain position, a transistor that is series connected with the power source and the lamp and responsive to the potential between the detection networks and the resistor so as to be responsive to the energization of the windings, thereby effecting energization of the lamp when a winding is energized and deenergization of the lamp when the windings are deenergized whereby a change in the status of a certain condition being monitored effects illumination of predetermined indicia corresponding to the certain condition at the certain position.

3. Apparatus for indicating the status of a plurality of conditions comprising, in combination, a plurality of switches responsive to at least one of the conditions being monitored, each of the switches normally being in the first operative state and being changed to a second operative state upon a predetermined change in the condition being monitored by the switch, a plurality of windings of a lessor number than the switches, each winding being connected in series with one of the switches to form a detection network and effective when energized to produce a magnetic field along the axis of the winding, the axes of the windings being aligned at predetermined angles to each other whereby the magnetic fields generated by the windings combine to form a resultant magnetic field the orientation of which varies in accordance with the energization of the windings, means connecting the detection networks in parallel, means for connecting the detection networks to a power source effective upon closure of the switch in a detection network to cause the energization by the power source of the winding in series circuit with the switch, at least one diode network, each diode network including at least two diodes each of which has an anode connected to the series circuit connection between the winding and the switch in respective detection networks and a cathode connected to a switch that is not part of a detection network and is effective when placed in the second operative condition to cause energization of the windings in the detection networks to which it is connected by diodes, thereby orienting the resultant magnetic field between the axes of the energized windings, and indicating means for indicating the status of the conditions being monitored, the indicating means including an indicia bearing member, means for moving the indicia bearing member past a certain position in accordance with the orientation of the resultant magnetic field, a lamp for illuminating the indicia at the certain position, and means responsive to the energization of the windings effective to energize the lamp when a winding is energized and deenergize the lamp when the windings are deenergized whereby a change in the status of a certain condition being monitored effects illumination of predetermined indicia at the certain position.

4. Apparatus for indicating the status of a plurality of conditions comprising, in combination, a plurality of switches each responsive to at least one of the conditions being monitored, each of the switches normally being in a first operative state and being changed to a second operative state upon a predetermined change in the condition being monitored by the switch; plurality of windings each connected in series with one of the switches to form a detection network and effective when energized to produce a magnetic field along the axis of the winding, the axes of the windings being aligned at predetermined angles to each other whereby the magnetic fields generated by the windings form a resultant magnetic field the orientation of which varies in accordance with the energization of the windings; means connecting the detection networks in parallel; means for connecting the detection networks to a power source effective upon closure of a switch to cause the energization by the power source of the winding in series circuit with the switch; indicating means for indicating the status of the conditions being monitored, the indicating means including an indicia bearing member, means for moving the indicia bearing member past a certain position in accordance with the orientation of the resultant magnetic field, a lamp for illuminating the indicia at the certain position, and means responsive to the energization of the windings effective to energize the lamp a predetermined time after a winding is energized and deenergize the lamp when the windings are deenergized whereby a change in the status of a certain condition being monitored effects illumination of predetermined indicia at the certain position after the predetermined time has elapsed; and warning means for providing an immediate indication of a change in a certain condition regardless of the position of the indicia bearing member, said warning means including an indicating device connected in series with the power source and the switch that is responsive to the certain condition effective to immediately energize said indicating device upon closure of the switch.

* * * * *